United States Patent Office 3,591,543
Patented July 6, 1971

3,591,543
TIME CONTROLLED GELATION OF POLYVINYL ALCOHOL WITH CHROMIC ION
Edward Philip Stafford, Wilmington, Del., assignor to E. I. du Pont de Nemours and Company, Wilmington, Del.
No Drawing. Filed June 9, 1969, Ser. No. 831,772
Int. Cl. C08f 29/26
U.S. Cl. 260—29.6
14 Claims

ABSTRACT OF THE DISCLOSURE

Method of gelling polyvinyl alcohol at controlled rates which comprises mixing an aqueous solution consisting essentially of (a) water, (b) polyvinyl alcohol which is at least about 85 mole percent hydrolyzed and has a molecular weight which provides a Hoeppler viscosity of about 4 to 150 centipoises in an amount sufficient to provide a Brookfield viscosity of at least 20 centipoises, (c) a water-soluble chromic salt in an amount sufficient to provide about 1 to 100 parts of chromic ion per 100 parts of polyvinyl alcohol, and (d) a water-soluble organic acid salt selected from the group consisting of ammonium, alkali metal and alkaline earth metal salts of organic acids of 1 to 6 carbon atoms in an amount sufficient to provide about 0.05 to 9 equivalents of organic acid anion per equivalent of chromic ion, with sufficient water-soluble strong alkaline material to provide a pH of at least about 8 and cause gelation of said polyvinyl alcohol within 10 seconds to 2 hours, the resulting basic solution containing sufficient polyvinyl alcohol to provide an initial Brookfield viscosity of about 20 to 400 centipoises. This method of gelation is particularly useful for soil stabilization and the preparation of filled compositions and foams.

BACKGROUND OF THE INVENTION (1) Field of the invention

This invention relates to time-controlled gelation of polyvinyl alcohol and to methods of stabilizing soil and preparing filled compositions and foams thereby.

(2) Description of the prior art

A number of gelling agents for polyvinyl alcohol are described in the literature including Congo Red, Direct Orange 8 (Colour Index 22120), Direct Green 12 (Colour Index 30290), borax and various compounds of aluminum, chromium, copper, iron, titanium, vanadium and zirconium. However, none of them has been suggested as suitable for the stabilization of soil.

Under normal conditions soil is stabilized by the growth of vegetation, especially grass, thereon. However, in some situations it is impossible or undesirable to provide this type of soil stabilization. For example, it is not desirable to have grass growing on a clay tennis court. Recently, it has become popular to cover the ground with artifical grass such as the new polypropylene turfs or outdoor carpeting. However, for best results it is necessary to first stabilize the surface underneath these artificial covers. In other situations, it would be desirable to be able to permanently stabilize and consolidate the soil in such a way that it becomes impervious to the flow of water. For example, it would be desirable to have a convenient and inexpensive means for consolidating the soil behind retaining walls through which water has a tendency to leak, such as basement walls and the walls of tunnels.

In U.S. Pat. No. 3,387,405 Iwasyk and Lawes teach the preparation of agricultural mulches by the gelation of a mixture of polyvinyl alcohol and wax or asphalt with a titanium oxalate complex such as potassium titanium oxalate. These mulches are applied as a continous film to the surface of a feed bed to provide a temporary cover which may last up to about 3 months. The mulch ultimately disintegrates upon extended exposure to weathering conditions.

Although the compositions disclosed in the Iwasyk and Lawes patent do provide good agricultural mulches, they do not provide permanent stabilization of the soil. For permanent stabilization of soil with polyvinyl alcohol, it is necessary that the gelled polyvinyl alcohol permanently impart substantial strength to the soil with which it is mixed. In order to accomplish this, two conditions are necessary. First, it is necessary that the gelling agent be one which provides a strong gel. The gels formed with tetravalent titanium tend to be weak. Second, it is necessary that there be a useful time delay between mixing of the polyvinyl alcohol and gelling agent and gelation thereof. Gel times of at least about 10 seconds are necessary for sufficient impregnation of the soil by the polyvinyl alcohol solution to provide a useful result. On the other hand, gelation must occur within about 2 hours to prevent continued penetration of the soil beyond the desired level, and to prevent washing away of the polyvinyl alcohol before it has had a chance to insolubilize.

Known trivalent chromium gelling agents for polyvinyl alcohol, such as chromic chloride, chromic nitrate or chromic acetate, would not be suitable for this use since they are known to provide essentially instantaneous gel times of the order of less than about 0.1 second. Such short gel times would not be suitable for the stabilization of soil since no substantial penetration of the soil could be achieved before gelation.

SUMMARY OF THE INVENTION

It has been discovered that polyvinyl alcohol can be gelled at controlled rates to gels having outstanding properties by mixing an aqueous solution consisting essentially of (a) water, (b) polyvinyl alcohol which is at least about 85 mole percent hydrolyzed and has a molecular weight which provides a Hoeppler viscosity of about 4 to 150 centipoises in an amount sufficient to provide a Brookfield viscosity of at least about 20 centipoises, (c) water-soluble chromic salt in an amount sufficient to provide 1 to 100 parts of chromic ion per 100 parts of polyvinyl alcohol, and (d) water-soluble organic acid salt selected from the group consisting of ammonium, alkali metal and alkaline earth metal salts of organic acids of 1 to 6 carbon atoms in an amount sufficient to provide 0.05 to 9 equivalents of organic acid anion per equivalent of chromic ion, with sufficient water-soluble strong alkaline material to provide a pH of at least about 8 and cause gelation of said polyvinyl alcohol within about 10 seconds to 2 hours after said mixing, the resulting basic solution containing sufficient polyvinyl alcohol to provide an initial Brookfield viscosity of about 20 to 400 centipoises. The term "consisting essentially of," as used throughout the specification and claims, is meant to include unspecified ingredients which do not materially affect the basic and novel characteristics of the composition, that is, which do not prevent the advantages of this invention from being realized.

In accordance with this invention, it has been discovered that, by the addition of a water-soluble organic acid salt with the chromic salt, a gel time of useful length is obtained. Moreover, this increased gel time is not accompanied by any material impairment in the compressive strength of the product. In fact the basic polyvinyl alcohol solutions of this invention develop unexpectedly high compressive strengths when used as binders for finely divided, solid filler materials. For example, when these solutions are used to consolidate 20 to 50 mesh silica sand, unconfined wet compressive strengths in excess of about 60 p.s.i. can be obtained. Furthermore, it has been discovered that the gel times of the basic solutions of this invention can be controlled over wide limits depending upon the amount of alkaline material added to the solution. By carefully adjusting the concentration of the various components of the basic polyvinyl alcohol solutions of this invention, gel times over the entire useful range of about 10 seconds to 2 hours can be obtained.

DETAILED DESCRIPTION OF THE INVENTION

The term "polyvinyl alcohol," as used throughout the specification and claims, refers to the water-soluble product obtained by the replacement of all or part of the acyl groups in a polyvinyl ester with hydroxyl groups. Well known methods of preparing polyvinyl alcohol include the alcoholysis, hydrolysis or saponification of a polyvinyl ester such as polyvinyl acetate. The polyvinyl alcohol used in accordance with this invention should be at least about 85 mole percent hydrolyzed, that is, at least about 85 mole percent of the acyl groups in the original polyvinyl ester should be replaced by hydroxyl groups. When the polyvinyl alcohol is less than about 85 mole percent hydrolyzed, a satisfactory gel does not form in accordance with this invention. Preferably the polyvinyl alcohol is at least about 95 mole percent hydrolyzed and most preferably, it is at least about 99 mole percent hydrolyzed.

The molecular weight of the polyvinyl alcohol should be such as to provide a Hoeppler viscosity of about 4 to 150 centipoises. The Hoeppler viscosities referred to herein are measured as a 4 percent aqueous solution at 20° C. by the falling ball method using a Hoeppler viscosimeter. When the molecular weight of the polyvinyl alcohol provides a viscosity of less than about 4 centipoises, gelation is slow, the resulting gel is weak and massive amounts of chromic ion are necessary to cause gelation. When the molecular weight of the polyvinyl alcohol provides a viscosity in excess of about 150 centipoises, the gel time tends to be rather short and gelation is difficult to control. Preferably the molecular weight provides a viscosity of about 20 to 135 centipoises.

The most preferred polyvinyl alcohols are those which are at least about 99 mole percent hydrolyzed and have a molecular weight which provides a Hoeppler viscosity of about 20 to 135 centipoises. Mixtures of polyvinyl alcohols having average mole percents hydrolyzed and molecular weights within the above ranges are also suitable.

As crosslinking agent for the polyvinyl alcohol, any compound which provides chromic ions in aqueous solution may be used. Suitable chromic compounds include water-soluble chromic salts such as chromic chloride, chromic bromide, chromic iodide, chromic nitrate, chromic sulfate, chromic formate, chromic acetate, chromic oxalate, chromic citrate, and the like. By "chromic salt" is meant a compound formed by replacement of one or more acidic hydrogens in an inorganic or organic acid with chromium having a valence of three. Preferably the chromic salt is of a strong inorganic acid and most preferably the chromic salt is chromic chloride or chromic nitrate.

The chromic salt should be present in an amount sufficient to provide about 1 to 100 parts by weight of chromic ion per 100 parts of polyvinyl alcohol. When less than about 1 part of chromic ion is present, the desirable compressive strengths obtained in accordance with this invention are not realized. When more than about 100 parts of chromic ion are present, the gel time is shortened without any corresponding improvement in compressive strength. Preferably about 5 to 50 parts of chromic ion are present per 100 parts of polyvinyl alcohol.

In accordance with this invention there must also be present a water-soluble organic acid salt selected from the group consisting of ammonium, alkali metal and alkaline earth metal salts of organic acids of 1 to 6 carbon atoms. The salt may be added as such or it may be formed in situ, for example by the addition of a water-soluble organic acid of 1 to 6 carbon atoms and a water-soluble ammonium, alkali metal or alkaline earth metal hydroxide. Suitable water-soluble organic acid salts include the ammonium, sodium, potassium, lithium, rubidium, cesium, beryllium, magnesium, calcium, strontium and barium salts of a wide range of organic acids including monocarboxylic acids of the alkane series such as formic, acetic, propionic, butyric and the like; dicarboxylic acids of the alkane series such as oxalic malonic, succinic and the like; dicarboxylic acids of the alkene series such as maleic, fumaric, itaconic and the like; and hydroxy mono-, di-, and tri-carboxylic acids such as lactic, tartaric, citric and the like. Specific examples of suitable salts include ammonium formate, ammonium acetate, ammonium oxalate, ammonium citrate, ammonium lactate, sodium acetate, sodium oxalate, sodium lactate, potassium acetate, potassium oxalate, potassium citrate, lithium acetate, lithium oxalate, rubidium acetate, cesium acetate, cesium oxalate, beryllium oxalate, magnesium formate, magnesium acetate, magnesium citrate, calcium butyrate, strontium formate, strontium acetate, strontium lactate, barium formate, barium acetate, barium propionate, and barium butyrate. Preferably the organic acid salt is an ammonium or sodium salt of an organic acid of 1 to 6 carbon atoms. Most preferably the organic acid compound is ammonium oxalate, sodium oxalate, ammonium acetate or sodium acetate.

The amount of organic acid salt should be sufficient to provide about 0.05 to 9 equivalents of organic acid anion per equivalent of chromic ion. When less than about 0.05 equivalent of organic acid anion is present, no substantial increase in the gel time over that obtained with the chromic salt is achieved. More than about 9 equivalents of organic acid anion per equivalent of chromic ion do not substantially further lengthen the gel time and thus are of no particular benefit. As used throughout the specification and claims, the term "equivalent of organic acid anion" is defined as the amount of anion which combines with one gram of hydrogen and the term "equivalent of chromic ion" is defined as the amount of chromic ion which combines with eight grams of oxygen. Preferably the organic acid salt is present in an amount sufficient to provide 0.2 to 5 equivalents of organic acid anion per equivalent of chromic ion.

Time controlled gelation is achieved in accordance with this invention by first dissolving in water a dry polyvinyl alcohol composition consisting essentially of (a) polyvinyl alcohol which is at least about 85 mole percent hydrolyzed and has a molecular weight which provides a Hoeppler viscosity of about 4 to 150 centipoises, (b) water-soluble chromic salt in an amount sufficient to provide about 1 to 100 parts of chromic ion per 100 parts of polyvinyl alcohol, and (c) water-soluble organic acid salt selected from the group consisting of ammonium, alkali metal and alkaline earth metal salts of organic acids of 1 to 6 carbon atoms in an amount sufficient to provide about 0.05 to 9 equivalents of organic acid anion per equivalent of chromic ion. In the case of polyvinyl alcohols which are more than about 90 percent hydrolyzed, a small amount of heat is required for complete solution in water. These solutions are most conveniently prepared by dissolving the polyvinyl alcohol composition in a small amount of hot water and then diluting this solution to the desired level with water at normal temperature. The final aqueous polyvinyl alcohol solution should contain sufficient polyvinyl alcohol to provide a Brookfield viscosity of at least about 20 centipoises, and preferably at least about 30 centipoises. The Brookfield viscosities referred to herein are measured with a Brookfield Viscometer model RVT using a number 2 spindle at 100 revolutions per minute at 24° C. By this method distilled water has a viscosity of about 12 centipoises.

Gelling of the polyvinyl alcohol is accomplished by adding a water-soluble strong alkaline material to the aqueous polyvinyl alcohol solution. By "water-soluble strong alkaline material" is meant an alkaline material which is sufficiently water-soluble and sufficiently alkaline to provide a pH of at least about 10 in water at a concentration not in excess of 10 percent by weight. Suitable alkaline materials for use in accordance with this invention include the hydroxides and orthosilicates of alkali metals such as lithium, sodium, potassium, rubidium, cesium and the like; ammonium hydroxide; hydroxides of alkaline earth metals such as calcium, strontium, barium and the like; the anhydrides of the above hydroxides including portland cement and calcium oxide; and the like. In the case of some alkaline materials such as portland cement some insolubles may be present. However, since the strong alkaline component has the requisite solubility, the resulting mixture is considered to be a "basic solution." Preferably the alkaline material is ammonium or sodium hydroxide or ammonium or sodium orthosilicate. The amount of alkaline material used should be sufficient to provide a pH of at least about 8, and preferably a pH of about 9 to 13.

Since the gel time commences upon mixing of the alkaline material with the polyvinyl alcohol solution, it is most satisfactory to prepare the basic polyvinyl alcohol solution only as needed. Mixing of the alkaline material with the polyvinyl alcohol solution is facilitated by first dissolving the alkaline material in water and then mixing the alkaline solution with the polyvinyl alcohol solution to form the final basic polyvinyl alcohol solution. This is readily accomplished by using proper pumping equipment which allows mixing of the two solutions just prior to discharge from the equipment through an appropriate nozzle.

The amount of polyvinyl alcohol present in the basic solution obtained by adding the alkaline material to the polyvinyl alcohol solution should be sufficient that the basic solution has an initial Brookfield viscosity of about 20 to 400 centipoises. Preferably, the resulting basic solution has a viscosity of about 30 to 300 centipoises. In general the viscosity of the aqueous polyvinyl alcohol solution does not decrease significantly when an aqueous caustic solution is added, and in most cases the viscosity will almost immediately begin to rise.

The results obtained in accordance with this invention will vary depending upon the concentration of the polyvinyl alcohol, chromic ions, organic acid cations, and alkaline material in the basic polyvinyl alcohol solution. As the polyvinyl alcohol concentration increases, the compressive strength of the resulting gel increases and the gel time is shortened. As the chromic ion concentration increases, the compressive strength of the gel is increased to a limit and the gel time is shortened. As the organic acid compound concentration is increased, the gel time is extended.

Further control over the gel time can be obtained by controlling the amount of alkaline material added. The minimum amount of alkaline material necessary to cause gelation is generally less than the amount necessary to provide a minimum of gel time. As increased amounts of alkaline material beyond the minimum amount necessary to cause gelation are used, the gel time decreases until the amount which gives the minimum gel time is reached. If larger amounts of alkaline material are added, an increase in the gel time is obtained. Since larger amounts of alkaline material are generally necessary to change the pH at this level, accurate control of the gel time is most readily accomplished by adding an amount of alkaline material in excess of the amount necessary to provide the minimum gel time.

Useful gel times varying from about 10 seconds to 2 hours are readily obtained in accordance with this invention. Preferably the gel times vary from about 15 seconds to 1 hour.

The time controlled gelation of polyvinyl alcohol of this invention is particularly useful for the stabilization of soil. Stabilization of the soil at the surface of the ground is readily accomplished by spraying the basic polyvinyl alcohol solution onto the surface of the soil to be stabilized thereby impregnating the soil and allowing said solution to gel after it has penetrated to the desired degree. Stabilization of underground soil, such as the soil behind a retaining wall, is accomplished by pumping the basic polyvinyl alcohol solution into the soil to be stabilized, thereby impregnating the soil, filling cracks and crevices, and allowing said solution to gel after it has penetrated to the desired degree.

The gelation method of this invention may also be used to prepare structurally stabilized, filled compositions. These stabilized compositions are prepared by impregnating a mass of filler material with the basic polyvinyl alcohol solution and allowing the solution to gel. It has been found in accordance with this invention that filled compositions, such as soil building blocks, containing at least about 50 percent by weight of finely divided, solid filler material and, as binder therefor, polyvinyl alcohol crosslinked with trivalent chromium have unexpectedly high compressive strengths. Suitable finely divided, solid filler materials for this application include soil, sand, clays such as aluminum silicates, minerals, stone, diatomaceous earth, volcanic glass, inorganic ash, pigments, metal particles, cellulose materials such as sawdust and wood chips, and the like. Filled compositions containing about 85 to 99 percent by weight of sand and about 0.5 to 2 percent by weight of polyvinyl alcohol generally have wet compressive strengths in excess of about 6 p.s.i. and preferably in excess of about 20 p.s.i. In some cases wet compressive strengths in excess of about 60 p.s.i. are obtained. These filled compositions often have dry compressive strengths of the order of about 300 p.s.i.

The time controlled gelation of polyvinyl alcohol of this invention is also suitable for applications other than soil stabilization. For example, the basic polyvinyl alcohol solutions disclosed in accordance with this invention can be used to provide polyvinyl alcohol foams as described by Deyrup in U.S. Pat. No. 3,318,856. Such foams can be prepared by mixing air with a basic polyvinyl alcohol solution of this invention by any suitable technique, such as passing air through the solution.

EXAMPLES

The following examples, illustrating the novel compositions and methods of this invention, are given without any intention that the invention be limited thereto. All percentages are by weight. In the tables PVA is used to designate polyvinyl alcohol.

In these examples, samples for testing compressive strengths were prepared by filling a cylindrical mold which has a one square inch end surface and is 3 inches long with 20–50 mesh silica sand and impregnating the sand with 25 cubic centimeters of polyvinyl alcohol solution and the specified amount of sodium hydroxide solution. The compressive strengths were measured by compressing at the rate of 1 inch per minute using an Instron Tensile Testing Machine. Wet compressive strengths were measured by removing the sample from the mold after 10-60 minutes and immersing in water for at least 16 hours before testing. Dry compressive strengths were measured by allowing the sample to air dry for at least 8 days before testing.

EXAMPLES 1-6

Polyvinyl alcohol solutions were prepared by dissolving 25 grams of polyvinyl alcohol which has a molecular weight which provides a Hoeppler viscosity of 55-65 centipoises and is 99.0-99.8% hydrolyzed, 5 grams of polyvinyl alcohol which has a molecular weight which provides a Hoeppler viscosity of 4-6 centipoises and is 99.0-99.8% hydrolyzed, various chromic salts in amounts sufficient to provide 9.3 parts of chromic ion per 100 parts of polyvinyl alcohol, and various amounts of alkali metal salts of organic acids in sufficient water to provide a liter of solution by heating. Aliquot portions of each of the polyvinyl alcohol solutions were mixed with various volumes of 8 percent sodium hydroxide solution and the gel times were determined. For comparison, the gel time of a control containing no alkali metal salt was also measured. The gel times obtained for the various compositions are given in Table I.

provides a Hoeppler viscosity of 28-32 centipoises and is 99.0-99.8% hydrolyzed, with various amounts of a 62% aqueous solution of chromic chloride ($CrCl_3 \cdot 6H_2O$) and anhydrous sodium acetate or anhydrous sodium oxalate in enough water to make a liter of solution with heating. Aliquot portions of this polyvinyl alcohol solution were mixed with various amounts of aqueous sodium hydroxide solutions. Gel times and wet and dry compressive strengths were measured. The data are given in Table II.

TABLE II

| Example | Grams of chromic chloride solution | Grams of PVA | Parts of Cr ion per 100 parts PVA | Organic acid salt Kind | Grams | Equiv. of acid anion per equiv. of chromic ion | Visc., cps. | Vol. NaOH per vol. of PVA | NaOH conc., percent | Gel time, min. | Compressive strength, p.s.i. Wet | Dry |
|---|---|---|---|---|---|---|---|---|---|---|---|---|
| 7 | 43.4 | 66 | 7.6 | $NaC_2H_3O_2$ | 45 | 1.9 | 285 | .1 | 8 | 2 | 35 | |
|   |      |    |     |                |    |     |     | .2 | 8 | 2 |    | |
| 8 | 21.7 | 33 | 7.6 | $NaC_2H_3O_2$ | 22.5 | 1.9 | 62 | .1 | 8 | 18 | 27 | |
|   |      |    |     |                |      |     |    | .2 | 8 | 25 |    | |
| 9 | 23   | 66 | 4.0 | $Na_2C_2O_4$ | 21.6 | 1.4 | 254 | .05 | 8 | 5 | | |
|   |      |    |     |              |      |     |     | .1  | 8 | 5 | 61 | 640 |
|   |      |    |     |              |      |     |     | .2  | 8 | 5 |    | |
| 10 | 11.5 | 33 | 4.0 | $Na_2C_2O_4$ | 10.8 | 1.4 | 58 | .05 | 8 | 14 | | |
|    |      |    |     |              |      |     |    | .1  | 8 | 16 | 46 | 395 |
|    |      |    |     |              |      |     |    | .2  | 8 | 22 |    | |
| 11 | 9.2  | 66 | 3.6 | $NaC_2H_3O_2$ | 39.1 | 8.2 | 258 | .04 | 32 | 60 | 30 | |

EXAMPLES 12-22

Polyvinyl alcohol solutions were prepared by dissolving 31 grams of polyvinyl alcohol which has a molecular weight which provides a Hoeppler viscosity of 55-65 centipoises and is 99.0-99.8% hydrolyzed, and variable amounts of a 62% aqueous solution of chromic chloride and anhydrous sodium oxalate (analyzed 65.8% oxalate) in sufficient water to provide a liter of solution by heating. The resulting compositions had Brookfield viscosities of 64 to 70 centipoises and initial pH's of 2.4 to 8. One hundred volumes of each of these compositions were mixed with 4 volumes of aqueous sodium hydroxide solutions of various concentrations. The gel times of the solutions were determined. Wet compressive strengths of filled

TABLE I

| | Polyvinyl alcohol solution | | | Equiv. anion per equiv. Cr | Gel time for indicated volume of NaOH per volume of PVA solution, minutes | | | | | | |
|---|---|---|---|---|---|---|---|---|---|---|---|
| | Chromic salt | Grams | Organic acid salt Type | Grams | | .08 | .10 | .12 | .16 | .20 | .25 | .30 |
| Example: | | | | | | | | | | | | |
| 1 | $CrCl_3 \cdot 6H_2O$ | 14.3 | $Na_2C_2O_4$ | 1.98 | .18 | 0.4 | 0.5 | 1.5 | 0.5 | 2.0 | 5.0 | 8.7 |
| 2 | $Cr_2(SO_4)_3 \cdot 5H_2O$ | 12.3 | $NaHCO_3$ | 1.96 | .18 | | 0.1 | 0.1 | 0.8 | 1.5 | 3.5 | |
| 3 | $CrBr_3 \cdot 6H_2O$ | 21.5 | $KC_2H_3O_2$ | 2.16 | .14 | 0.1 | 0.1 | 0.1 | 0.8 | 2.0 | 5.0 | |
| 4 | $CrCl_3 \cdot 6H_2O$ | 14.3 | $Na_2C_2O_4$ | 3.04 | .28 | 0.1 | 0.3 | 0.5 | 0.7 | 1.0 | 3.2 | 3.5 |
| 5 | $Cr(NO_3)_3 \cdot 9H_2O$ | 21.5 | $Na_3C_6H_5O_7 \cdot 2H_2O$ [1] | 3.11 | .20 | 7.0 | 4.0 | 2.0 | 4.0 | 6.0 | 26 | |
| 6 | $CrCl_3 \cdot 6H_2O$ | 14.3 | Disodium salt of ethylene dinitrilo tetraacetic acid.[2] | 2.56 | .09 | | 0.2 | 0.4 | 1.0 | 1.8 | 5.0 | |
| Control | $CrCl_3 \cdot 6H_2O$ | 14.3 | None | | | 0.1 | 0.1 | 0.1 | 0.1 | 0.1 | 0.1 | 0.1 |

[1] Sodium citrate.
[2] $HOCOCH_2(NaOCOCH_2)NCH_2CH_2N(CH_2COONa)CH_2COOH \cdot 2H_2O$.

EXAMPLES 7-11

Polyvinyl alcohol solutions were prepared by mixing polyvinyl alcohol which has a molecular weight which compositions were also determined. Controls containing no oxalate ion were also run for comparison. The results are given in Table III.

TABLE III

| | Grams of chromic chloride solution | Parts Cr ion per 100 parts PVA | Grams sodium oxalate | Equiv. of oxalate anion per Equiv. of chromic ion | NaOH conc., percent | Gel time, min. | pH | Wet compressive strength, p.s.i. |
|---|---|---|---|---|---|---|---|---|
| Control | 4.8 | 1.94 | 0 | | 4 | ∞ | 7.5 | |
| | | | | | 6 | 1 | 11.3 | |
| | | | | | 32 | 6 | 12.8 | 31 |
| Example 12 | 4.8 | 1.94 | 0.5 | .328 | 4 | ∞ | 10.1 | |
| | | | | | 6 | 11 | 11.8 | |
| | | | | | 32 | 19 | 12.9 | 27 |
| Example 13 | 4.8 | 1.94 | 1.0 | .656 | 4 | ∞ | 10.4 | |
| | | | | | 6 | 28 | 11.5 | |
| | | | | | 32 | 40 | 12.7 | 30 |
| Control | 9.5 | 3.54 | 0 | | 4 | ∞ | 5.3 | |
| | | | | | 8 | <0.1 | 10.3 | |
| | | | | | 16 | 0.2 | 12.3 | |
| | | | | | 32 | <0.1 | 12.3 | |

TABLE III—Continued

| | Grams of chromic chloride solution | Parts Cr ion per 100 parts PVA | Grams sodium oxalate | Equiv. of oxalate anion per Equiv. of chromic ion | NaOH conc., percent | Gel time, min. | pH | Wet compressive strength, p.s.i. |
|---|---|---|---|---|---|---|---|---|
| Example 14 | 9.5 | 3.54 | 1.0 | .358 | 6 | ∞ | 8.2 | |
| | | | | | 8 | ∞ | 10.4 | |
| | | | | | 16 | 1.0 | 21.3 | |
| | | | | | 32 | 2.2 | 12.8 | 44 |
| Example 15 | 9.5 | 3.54 | 2.0 | .716 | 8 | ∞ | 10.5 | |
| | | | | | 16 | 3.5 | 11.4 | |
| | | | | | 32 | 5.0 | 12.8 | 55 |
| Example 16 | 9.5 | 3.54 | 4.0 | 1.432 | 8 | 3.3 | 11.5 | |
| | | | | | 16 | 16 | 12.2 | |
| | | | | | 32 | 14 | 12.8 | 42 |
| Control | 18.2 | 6.78 | 0 | | 8 | ∞ | 5.1 | |
| | | | | | 32 | <0.1 | 12.7 | |
| Example 17 | 18.2 | 6.78 | 2.0 | .375 | 8 | ∞ | 5.7 | |
| | | | | | 16 | 5 | 0.6 | |
| | | | | | 25 | 9.6 | 12.7 | |
| | | | | | 32 | 1.0 | 12.8 | 51 |
| Example 18 | 18.2 | 6.78 | 6.0 | 1.125 | 8 | ∞ | 8.3 | |
| | | | | | 16 | 7 | 12.0 | |
| | | | | | 25 | 5 | 12.6 | |
| | | | | | 32 | 4 | 12.8 | 47 |
| Example 19 | 18.2 | 6.78 | 10.0 | 1.878 | 8 | 18 | 11.0 | |
| | | | | | 16 | 10 | 12.0 | |
| | | | | | 25 | 9 | 12.4 | |
| | | | | | 32 | 9 | 12.7 | 57 |
| Control | 26.8 | 10.0 | 0 | | 8 | ∞ | 4.9 | |
| | | | | | 16 | ∞ | 5.4 | |
| | | | | | 32 | (1) | 12.3 | |
| Example 20 | 26.8 | 10.0 | 6.0 | .763 | 16 | ∞ | 8.6 | |
| | | | | | 25 | 2.3 | 12.5 | |
| | | | | | 32 | 6 | 12.9 | 47 |
| Example 21 | 26.8 | 10.0 | 12.0 | 1.526 | 16 | 5 | 12.5 | |
| | | | | | 25 | 6 | 12.6 | |
| | | | | | 32 | 6 | 12.9 | 64 |
| Example 22 | 26.8 | 10.0 | 18.0 | 2.285 | 8 | 14 | 10.8 | |
| | | | | | 16 | 11 | 11.8 | |
| | | | | | 32 | 10 | 12.6 | 45 |

1 Precipitate formed.

EXAMPLES 23–31

The procedure of Examples 12–22 was repeated except that the organic acid salt was sodium acetate $(NaC_2H_3O_2 \cdot 3H_2O)$ rather than sodium oxalate. The results are given in Table IV.

TABLE IV

| | Grams of chromic chloride solution | Parts Cr ion per 100 parts PVA | Grams sodium acetate | Equiv. of acetate anion per equiv. of chromic ion | NaOH conc., percent | Gel time, min. | pH | Wet compressive strength, p.s.i. |
|---|---|---|---|---|---|---|---|---|
| Control | 4.8 | 1.94 | 0 | | 4 | ∞ | 7.5 | |
| | | | | | 6 | 1.0 | 11.3 | |
| | | | | | 32 | 6 | 12.8 | 31 |
| Example 23 | 4.8 | 1.94 | .5 | .243 | 4 | 10 | 9.7 | |
| | | | | | 8 | 2.2 | 11.7 | |
| | | | | | 16 | 8 | 12.7 | |
| | | | | | 32 | 18 | 13.0 | 28 |
| Control | 9.5 | 3.54 | 0 | | 4 | ∞ | 5.3 | |
| | | | | | 8 | <0.1 | 10.3 | |
| | | | | | 16 | 0.2 | 12.3 | |
| | | | | | 32 | <0.1 | 12.3 | |
| Example 24 | 9.5 | 3.54 | 1.0 | .267 | 4 | ∞ | 5.9 | |
| | | | | | 8 | 0.5 | 11.0 | |
| | | | | | 16 | 0.6 | 9.4 | |
| | | | | | 32 | 4 | 10.4 | 39 |
| Example 25 | 9.5 | 3.54 | 2.0 | .534 | 4 | ∞ | 8.0 | |
| | | | | | 8 | 4 | 10.0 | |
| | | | | | 16 | 4 | 12.4 | |
| | | | | | 32 | 8 | 12.8 | 38 |
| Example 26 | 9.5 | 3.54 | 4.0 | 1.068 | 4 | ∞ | 8.1 | |
| | | | | | 8 | 12 | 11.4 | |
| | | | | | 16 | 15 | 11.9 | |
| | | | | | 32 | 20 | 12.3 | 28 |
| Control | 18.2 | 6.78 | 0 | | 8 | ∞ | 5.1 | |
| | | | | | 32 | 0.1 | 12.7 | |
| Example 27 | 18.2 | 6.78 | 2.0 | .280 | 8 | ∞ | 8.1 | |
| | | | | | 16 | 0.1 | 11.0 | |
| | | | | | 32 | 1.0 | 12.2 | 37 |
| Example 28 | 18.2 | 6.78 | 4.0 | .560 | 8 | ∞ | 6.0 | |
| | | | | | 16 | 1.0 | 9.8 | |
| | | | | | 32 | 1.0 | 12.5 | 41 |
| Example 29 | 18.2 | 6.78 | 6.0 | .840 | 8 | ∞ | 8.0 | |
| | | | | | 16 | 3 | 11.6 | |
| | | | | | 32 | 4 | 12.7 | 46 |
| Control | 26.8 | 10.0 | 0 | | 8 | ∞ | 4.9 | |
| | | | | | 16 | ∞ | 5.4 | |
| | | | | | 32 | (1) | 12.3 | |
| Example 30 | 26.8 | 10.0 | 4.0 | .379 | 8 | ∞ | 8.7 | |
| | | | | | 16 | 0.1 | 9.0 | |
| | | | | | 32 | 1.0 | 12.0 | |
| Example 31 | 26.8 | 10.0 | 6.0 | .569 | 8 | ∞ | 8.7 | |
| | | | | | 16 | 5 | 7.9 | |
| | | | | | 32 | 1.2 | 11.8 | 48 |

1 Precipitate formed.

EXAMPLES 32-42

Polyvinyl alcohol solutions were prepared by dissolving 33 grams of polyvinyl alcohol which has a molecular weight which provides a Hoeppler viscosity of 28–32 centipoises and is 99.0–99.8% hydrolyzed, various amounts of a 62% aqueous chromic chloride solution, and various amounts of sodium acetate ($NaC_2H_3O_2 \cdot 3H_2O$) in sufficient water to give a liter of solution by heating. One hundred volume portions of these polyvinyl alcohol solutions were mixed with 4 volumes of aqueous sodium hydroxide solutions of various concentrations. The viscosities, pH's and gel times of these solutions were measured. Wet and dry compressive strengths of filled compositions were also determined. The results are given in Table V.

EXAMPLE 50

This example illustrates a low viscosity basic solution.

A polyvinyl alcohol solution was prepared by dissolving 13 grams of polyvinyl alcohol which has a molecular weight which provides a Hoeppler viscosity of 55–65 centipoises and is 99.0–99.8% hydrolyzed, 24.3 grams of a 62% aqueous chromic chloride ($CrCl_3 \cdot 6H_2O$) solution, and 2.0 grams of anhydrous sodium oxalate (analyzed 65.8% oxalate) in sufficient water to provide a liter of solution by heating. The resulting solution had 21.5 parts of chromic ion per 100 parts of polyvinyl alcohol, 0.185 equivalent of oxalate ion per equivalent of chromic ion, a Brookfield viscosity of 26, and a pH of 1.9.

One hundred milliliter portions of this polyvinyl alcohol

TABLE V

| Example | Grams chromic chloride solution | Parts Cr ion per 100 parts PVA | Grams sodium acetate | Equiv. acetate per equiv. Cr ion | PVA solution Brookfield visc., cps. | pH | NaOH conc., percent | Gel time, min. | pH | Wet compressive strength, p.s.i. | Dry compressive strength, p.s.i. |
|---|---|---|---|---|---|---|---|---|---|---|---|
| 32 | 9.5 | 3.3 | 2.32 | 0.27 | 58 | 2.5 | 8 | 2 | 11.9 | | |
| | | | | | | | 16 | 3 | 12.2 | | |
| | | | | | | | 32 | 4 | 12.3 | 31 | 390 |
| 33 | 18.2 | 6.4 | 13.92 | 0.84 | 60 | 3.7 | 16 | 7 | 9.8 | | |
| | | | | | | | 32 | 7 | 12.7 | 40 | 330 |
| 34 | 18.2 | 6.4 | 23.2 | 1.4 | 54 | 4.6 | 8 | 30 | | | |
| | | | | | | | 16 | 30 | | | |
| | | | | | | | 32 | 30 | | 37 | 335 |
| 35 | 18.2 | 6.4 | 27.84 | 1.7 | 59 | 4.8 | 16 | 60 | | | |
| | | | | | | | 25 | 35 | | | |
| | | | | | | | 32 | 35 | | 37 | 360 |
| 36 | 26.8 | 9.4 | 18.56 | .76 | 59 | 3.5 | 16 | 12 | | | |
| | | | | | | | 25 | 2 | | | |
| | | | | | | | 32 | 3 | | 42 | 270 |
| 37 | 26.8 | 9.4 | 23.2 | .94 | 56 | 3.8 | 16 | ∞ | | | |
| | | | | | | | 25 | 4.5 | | | |
| | | | | | | | 32 | 5 | | 47 | 300 |
| 38 | 26.8 | 9.4 | 27.84 | 1.1 | 60 | 4.3 | 16 | ∞ | | | |
| | | | | | | | 25 | 9 | | | |
| | | | | | | | 32 | 8 | | 41 | 365 |
| 39 | 26.8 | 9.4 | 32.48 | 2.7 | 60 | 4.5 | 16 | ∞ | 9.3 | | |
| | | | | | | | 32 | 12 | 12.3 | 39 | 430 |
| 40 | 36.4 | 12.4 | 32.48 | 1.0 | 60 | 4.0 | 16 | ∞ | 8.4 | | |
| | | | | | | | 32 | 3 | 11.0 | 50 | 340 |
| 41 | 36.4 | 12.4 | 41.76 | 1.3 | 60 | 4.4 | 16 | ∞ | 8.8 | | |
| | | | | | | | 32 | 5 | 11.7 | 37 | 445 |
| 42 | 36.4 | 12.4 | 51.04 | 1.6 | 60 | 4.7 | 16 | ∞ | 8.8 | | |
| | | | | | | | 32 | 5.5 | 12.1 | 41 | 460 |

EXAMPLES 43-49

Polyvinyl alcohol solutions were prepared by dissolving 33 grams of polyvinyl alcohol which has a molecular weight which provides a Hoeppler viscosity of 28–32 centipoises and is 99.0–99.8% hydrolyzed, various amounts of a 62% aqueous chromic chloride solution and anhydrous sodium oxalate (analyzed 65.8% oxalate) in sufficient water to give a liter of solution by heating. One hundred volume portions of each of these compositions were mixed with 4 volumes of aqueous sodium hydroxide solutions of various concentrations and gel times were determined. Wet and dry compressive strengths of filled compositions were also determined. The results are given in Table VI.

solution were mixed with various amounts of a 32% aqueous sodium hydroxide solution. The initial viscosities, gel times and pH's of these basic solutions were measured. The wet compressive strength of a filled composition was also determined. The results are given in Table VII.

TABLE VII

| Volume of NaOH per volume of PVA | Initial Brookfield viscosity, cps. | Gel time, min. | pH | Wet compressive strength, p.s.i. |
|---|---|---|---|---|
| .04 | 26 | 4 | 11.3 | |
| .08 | 26 | 15 | 12.8 | 9 |

TABLE VI

| Example | Grams chromic chloride solution | Parts Cr ion per 100 parts PVA | Grams sodium oxalate | Equiv. oxalate per equiv. Cr ion | Brookfield viscosity, cps. | pH | NaOH conc., percent | Gel time, min. | pH | Wet compressive strength, p.s.i. | Dry compressive strength, p.s.i. |
|---|---|---|---|---|---|---|---|---|---|---|---|
| 43 | 9.5 | 3.3 | 2.16 | .36 | 58 | 2.7 | 8 | 3 | 12.2 | | |
| | | | | | | | 16 | 3 | 12.4 | | |
| | | | | | | | 32 | 5 | 12.8 | 36 | 378 |
| 44 | 18.2 | 6.4 | 12.72 | 1.1 | 57 | 4.0 | 8 | 7 | 12.0 | | |
| | | | | | | | 16 | 7 | 12.1 | | |
| | | | | | | | 32 | 7 | 12.8 | 48 | 393 |
| 45 | 18.2 | 6.4 | 21.6 | 1.9 | 56 | 5.9 | 8 | 9 | | | |
| | | | | | | | 16 | 9 | | | |
| | | | | | | | 32 | 9 | | 48 | 407 |
| 46 | 26.8 | 9.4 | 17.28 | 1.0 | 53 | 6.2 | 8 | ∞ | 10.8 | | |
| | | | | | | | 16 | ∞ | 10.8 | | |
| | | | | | | | 32 | 6 | 12.9 | 47 | 415 |
| 47 | 26.8 | 9.4 | 30.30 | 1.8 | 55 | 7.0 | 8 | 9 | 12.7 | | |
| | | | | | | | 16 | 9 | 12.7 | | |
| | | | | | | | 32 | 9 | 13.1 | 45 | 430 |
| 48 | 36.4 | 12.4 | 30.30 | 1.3 | 56 | 6.1 | 8 | 5 | 12.2 | | |
| | | | | | | | 16 | 5 | 12.8 | | |
| | | | | | | | 32 | 5 | 13.0 | 53 | 480 |
| 49 | 36.4 | 12.4 | 47.7 | 2.0 | 58 | 6.5 | 8 | 7 | 11.5 | | |
| | | | | | | | 16 | 6 | 12.0 | | |
| | | | | | | | 32 | 6 | 12.7 | 27 | 450 |

EXAMPLE 51

This example illustrates a high ratio of chromic ion to polyvinyl alcohol and a high molecular weight polyvinyl alcohol. A polyvinyl alcohol solution was prepared by dissolving 20 grams of polyvinyl alcohol which has a molecular weight which provides a Hoeppler viscosity of 115–135 centipoises and is 99.3–100% hydrolyzed, 156 grams of a 62% aqueous chromic chloride ($CrCl_3 \cdot 6H_2O$) solution, and 76 grams of anhydrous sodium acetate in sufficient water to provide one liter of solution by heating. The resulting solution had 90 parts of chromic ion per 100 parts of polyvinyl alcohol, 0.65 equivalent of acetate anion per equivalent of chromic ion, a Brookfield viscosity of 59 centipoises, and a pH of 2.2.

One hundred milliliter portions of this polyvinyl alcohol solution were mixed with various amounts of 8% and 32% aqueous sodium hydroxide solutions. The initial viscosities, gel times and pH's of these basic solutions were measured. The wet compressive strength of a filled composition was also determined. The results are given in Table VIII.

TABLE VIII

| Concentration of NaOH, percent | Vol. of NaOH per vol. of PVA | Initial Brookfield visc., cps. | Gel time, min. | pH | Wet compressive strength, p.s.i. |
|---|---|---|---|---|---|
| 32 | .04 | 59 | ∞ | 4.2 | |
| 32 | .08 | 59 | 0.2 | 8.8 | |
| 32 | .16 | 59 | 0.2 | 11.0 | |
| 32 | .32 | 59 | 0.4 | 12.6 | |
| 8 | .5 | 59 | 0.4 | 11.5 | |
| 8 | 1.0 | 28 | 4.0 | 13.0 | 10 |

EXAMPLE 52

This example illustrates the use of a low molecular weight polyvinyl alcohol.

About 12 grams of polyvinyl alcohol which has a molecular weight which provides a Hoeppler viscosity of 4–6 centipoises and is 99.0–99.8% hydrolyzed, 10.25 grams of chromic chloride ($CrCl_3 \cdot 6H_2O$) and 14.82 grams of anhydrous sodium oxalate were dissolved in sufficient water to provide a liter of solution by heating. The resulting solution contained 1.67 parts of chromic ion per 100 parts of polyvinyl alcohol, 1.0 equivalent of oxalate ion per equivalent of chromic ion and a Brookfield viscosity of 110 centipoises. About 100 volumes of this solution were mixed with 4 volumes of 32% sodium hydroxide. The gel time was 38 minutes.

EXAMPLE 53

This example illustrates the use of a lower percent hydrolyzed polyvinyl alcohol.

About 100 grams of polyvinyl alcohol which has a molecular weight which provides a Hoeppler viscosity of 4–6 centipoises and is 87.7–89.7% hydrolyzed, 53.6 grams of a 62% aqueous chromic chloride solution (analyzed 11.58% chromic ion) and 3.04 grams of anhydrous sodium oxalate (analyzed 65.8% oxalate ion) were dissolved in sufficient water to provide a liter of solution by heating. This solution contained 6.2 parts of chromic ion per 100 parts of polyvinyl alcohol and 0.12 equivalent of oxalate ion per equivalent of chromic ion. To a portion of this solution was added sufficient 37% aqueous sodium hydroxide solution to raise the pH to 10.5. The gel time was about 1 minute. The dry compressive strength of a molded sample gelled in the same manner was about 550 p.s.i.

EXAMPLES 54–59

Soil building blocks were prepared from soil which had passed through a 10 mesh screen and contained 20% clay, 40% silt and 40% sand. A polyvinyl alcohol solution was prepared by dissolving 46.3 grams of polyvinyl alcohol which has a molecular weight which provides a Hoeppler viscosity of 55–65 centipoises and is 99.0–99.8% hydrolyzed, 23.7 grams of chromic nitrate ($Cr(NO_3)_3 \cdot 9H_2O$, analyzed 13.3% chromic ion), and 19.5 grams of anhydrous sodium oxalate (analyzed 62.14% oxalate ion) in sufficient water to provide a liter of solution by heating. This solution contained 6.8 parts of chromic ion per 100 parts of polyvinyl alcohol and 1.52 equivalents of oxalate ion per equivalent of chromic ion.

About 120 grams of the soil are mixed with various amounts of the polyvinyl alcohol solution and 0.1 volume of 8% aqueous sodium hydroxide solution per volume of polyvinyl alcohol solution. In some cases additional water was added to improve the consistency of the mixture. The mixture was placed in a 1 inch by 2 inch mold and allowed to gel. The resulting block was then removed from the mold and air dried for at least 48 hours at 40° C., until it was completely dry as evidenced by its failure to lose weight upon further heating. The dry compressive strength of the block was then measured. A control which contained no polyvinyl alcohol solution was also run.

TABLE IX

| | Grams of PVA solution | Grams of water | Dry compressive strength, p.s.i. |
|---|---|---|---|
| Ex. 54 | 5 | 22 | 184 |
| Ex. 55 | 10 | 16 | 260 |
| Ex. 56 | 15 | 13 | 405 |
| Ex. 57 | 20 | 10 | 560 |
| Ex. 58 | 25 | 5 | 615 |
| Ex. 59 | 25 | 0 | 585 |
| Control | 0 | 25 | 160 |

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

I claim:

1. The method of gelling polyvinyl alcohol at controlled rates which comprises mixing an aqueous solution consisting essentially of
   (a) water,
   (b) polyvinyl alcohol which is at least 85 mole percent hydrolyzed and has a molecular weight which provides a Hoeppler viscosity of 4 to 150 centipoises in an amount sufficient to provide a Brookfield viscosity of at least 20 centipoises,
   (c) water-soluble chromic salt in an amount sufficient to provide 1 to 100 parts of chromic ion per 100 parts of polyvinyl alcohol, and
   (d) water-soluble organic acid salt selected from the group consisting of the ammonium, alkali metal and alkaline earth metal salts of organic acids of 1 to 6 carbon atoms in an amount sufficient to provide 0.05 to 9 equivalents of organic acid anion per equivalent of chromic ion,
with sufficient water-soluble strong alkaline material to provide a pH of at least 8 and cause gelation of said polyvinyl alcohol within 10 seconds to 2 hours after said mixing, the resulting basic solution containing sufficient polyvinyl alcohol to provide an initial Brookfield viscosity of 20 to 400 centipoises.

2. The method of claim 1 in which the polyvinyl alcohol is at least 95 mole percent hydrolyzed and has a molecular weight which provides a Hoeppler viscosity of 20 to 135 centipoises, the chromic salt is of strong inorganic acid and is present in an amount sufficient to provide 5 to 50 parts of chromic ion per 100 parts of polyvinyl alcohol, the organic acid salt is selected from the group consisting of ammonium and sodium salts of organic acid of 1 to 6 carbon atoms and is present in an amount sufficient to provide 0.2 to 5 equivalents of organic acid anion per equivalent of chromic ion, the alkaline material is present in an amount sufficient to provide a pH of 9 to 13 and cause gelation of said polyvinyl alcohol within 15 seconds to 1 hour, and the resulting basic solution contains sufficient polyvinyl alcohol to provide an initial Brookfield viscosity of 30 to 300 centipoises.

3. The method of claim 2 in which an aqueous solution consisting essentially of water, polyvinyl alcohol, chromic salt and organic acid salt is mixed with an aqueous solution of the strong alkaline material.

4. The method of claim 3 in which the polyvinyl alcohol is at least 99 mole percent hydrolyzed, the chromic salt is selected from the group consisting of chromic chloride and chromic nitrate, the organic acid salt is selected from the group consisting of ammonium oxalate, sodium oxalate, ammonium acetate, and sodium acetate, and the alkaline material is selected from the group consisting of sodium hydroxide and sodium orthosilicate.

5. The method of claim 3 in which soil is stabilized by spraying the resulting basic solution onto the surface of the soil to be stabilized thereby impregnating the soil and allowing said solution to gel after it has penetrated to the desired degree.

6. The method of claim 5 in which the polyvinyl alcohol is at least 99 mole percent hydrolyzed, the chromic salt is selected from the group consisting of chromic chloride and chromic nitrate, the organic acid salt is selected from the group consisting of ammonium oxalate, sodium oxalate, ammonium acetate and sodium acetate, and the alkaline material is selected from the group consisting of sodium hydroxide and sodium orthosilicate.

7. The method of claim 3 in which soil is stabilized by pumping the resulting basic solution into the soil to be stabilized, thereby impregnating the soil, filling cracks and crevices, and allowing said solution to gel after it has penetrated to the desired degree.

8. The method of claim 7 in which the polyvinyl alcohol is at least 99 mole percent hydrolyzed, the chromic salt is selected from the group consisting of chromic chloride and chromic nitrate, the organic acid salt is selected from the group consisting of ammonium oxalate, sodium oxalate, ammonium acetate and sodium acetate, and the alkaline material is selected from the group consisting of sodium hydroxide and sodium orthosilicate.

9. An aqueous, gellable polyvinyl alcohol solution which consists essentially of
  (a) water,
  (b) polyvinyl alcohol which is at least 85 mole percent hydrolyzed and has a molecular weight which provides a Hoeppler viscosity of 4 to 150 centipoises in an amount sufficient to provide a Brookfield viscosity of at least 20 centipoises,
  (c) water-soluble chromic salt in an amount sufficient to provide 1 to 100 parts of chromic ion per 100 parts of polyvinyl alcohol, and
  (d) water-soluble organic acid salt selected from the group consisting of the ammonium, alkali metal and alkaline earth metal salts of organic acids of 1 to 6 carbon atoms in an amount sufficient to provide 0.05 to 9 equivalents of organic acid anion per equivalent of chromic ion.

10. The aqueous solution of claim 9 in which the polyvinyl alcohol is at least 95 mole percent hydrolyzed and has a molecular weight which provides a Hoeppler viscosity of 20 to 135 centipoises, the chromic salt is of strong inorganic acid and is present in an amount sufficient to provide 5 to 50 parts of chromic ion per 100 parts of polyvinyl alcohol, and the organic acid salt is selected from the group consisting of ammonium and sodium salts of organic acid of 1 to 6 carbon atoms and is present in an amount sufficient to provide 0.2 to 5 equivalents of organic acid anion per equivalent of chromic ion.

11. The aqueous solution of claim 10 in which the polyvinyl alcohol is at least 99 mole percent hydrolyzed, the chromic salt is selected from the group consisting of chromic chloride and chromic nitrate, and the organic acid salt is selected from the group consisting of ammonium oxalate, sodium oxalate, ammonium acetate and sodium acetate.

12. A dry polyvinyl alcohol composition consisting essentially of
  (a) polyvinyl alcohol which is at least 85 mole percent hydrolyzed and has a molecular weight which provides a Hoeppler viscosity of 4 to 150 centipoises,
  (b) water-soluble chromic salt in an amount sufficient to provide 1 to 100 parts of chromic ion per 100 parts of polyvinyl alcohol, and
  (c) water-soluble organic acid salt selected from the group consisting of ammonium, alkali metal and alkaline earth metal salts of organic acids of 1 to 6 carbon atoms in an amount sufficient to provide 0.05 to 9 equivalents of organic acid anion per equivalent of chromic ion.

13. The dry polyvinyl alcohol composition of claim 12 in which the polyvinyl alcohol is at least 95 mole percent hydrolyzed and has a molecular weight which provides a Hoeppler viscosity of 20 to 135 centipoises, the chromic salt is of strong inorganic acid and is present in an amount sufficient to provide 5 to 50 parts of chromic ion per 100 parts of polyvinyl alcohol, and the organic acid salt is selected from the group consisting of ammonium and sodium salts of organic acid of 1 to 6 carbon atoms and is present in an amount sufficient to provide 0.2 to 5 equivalents of organic acid anion per equivalent of chromic ion.

14. The dry polyvinyl alcohol composition of claim 13 in which the polyvinyl alcohol is at least 99 mole percent hydrolyzed, the chromic salt is selected from the group consisting of chromic chloride and chromic nitrate, and the organic acid salt is selected from the group consisting of ammonium oxalate, sodium oxalate, ammonium acetate and sodium acetate.

References Cited

UNITED STATES PATENTS

| | | | |
|---|---|---|---|
| 2,902,390 | 9/1959 | Bell | 117—132 |
| 3,265,657 | 8/1966 | Sinclair | 260—29.6 |
| 3,492,250 | 1/1970 | Deyrup | 260—2.5 |

MELVIN GOLDSTEIN, Primary Examiner

U.S. Cl. X.R.

260—2.5, 41, 91.3